United States Patent
Kompella

(10) Patent No.: US 8,732,335 B2
(45) Date of Patent: *May 20, 2014

(54) DEVICE COMMUNICATIONS OVER UNNUMBERED INTERFACES

(71) Applicant: Juniper Networks, Inc., Sunnyvale, CA (US)

(72) Inventor: Kireeti Kompella, Los Altos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/692,275

(22) Filed: Dec. 3, 2012

(65) Prior Publication Data

US 2013/0159549 A1   Jun. 20, 2013

Related U.S. Application Data

(63) Continuation of application No. 11/860,187, filed on Sep. 24, 2007, now Pat. No. 8,327,016.

(60) Provisional application No. 60/887,048, filed on Jan. 29, 2007.

(51) Int. Cl.
*G06F 15/173* (2006.01)
*G01R 31/08* (2006.01)

(52) U.S. Cl.
USPC ............................. 709/238; 709/242; 370/217

(58) Field of Classification Search
USPC .......... 709/220, 227, 238, 242; 370/217, 238, 370/241, 312, 338, 349, 407
See application file for complete search history.

(56) References Cited

U.S. PATENT DOCUMENTS

| | | |
|---|---|---|
| 6,307,843 B1 | 10/2001 | Okanoue |
| 6,434,134 B1 | 8/2002 | La Porta et al. |
| 6,675,208 B1 | 1/2004 | Rai et al. |
| 6,683,865 B1 | 1/2004 | Garcia-Luna-Aceves et al. |
| 7,058,016 B1 | 6/2006 | Harper |
| 2004/0022194 A1 | 2/2004 | Ricciulli |
| 2004/0120329 A1 | 6/2004 | Chung et al. |
| 2004/0153573 A1 | 8/2004 | Kim et al. |
| 2006/0047791 A1 | 3/2006 | Bahl |
| 2006/0250951 A1 | 11/2006 | Ueda et al. |
| 2007/0016681 A1 | 1/2007 | Suzuki et al. |
| 2007/0165532 A1 | 7/2007 | Retana et al. |
| 2007/0245034 A1 | 10/2007 | Retana et al. |

OTHER PUBLICATIONS

Co-pending U.S. Appl. No. 11/860,187, filed Sep. 24, 2007 entitled "Device Communications Over Unnumbered Interfaces", by Kireeti Kompella, 28 pages.
K. Kompella, The Pros and Cons of "Going Unnumbered", Juniper Networks, Inc., www.juniper.net, printed May 30, 2006, pp. 1-26.
E. Schwartz, Routing, http://www.mit.edu/~elliot/internet/1998/routing-notes.html, printed May 30, 2006, pp. 1-7.

*Primary Examiner* — Aaron Strange
(74) *Attorney, Agent, or Firm* — Harrity & Harrity, LLP

(57) ABSTRACT

A method and a network device for enabling communication between unnumbered interfaces are provided. A device level address may be assigned to a network device. The network device may announce the assigned device level address to a neighboring network device over a link. A corresponding device level address associated with the neighboring network device may be received over the link. A route may be stored including the received device level address associated with the neighboring network device and the link. In some implementations, the announcement of the assigned device level address is performed during protocol configuration.

20 Claims, 7 Drawing Sheets

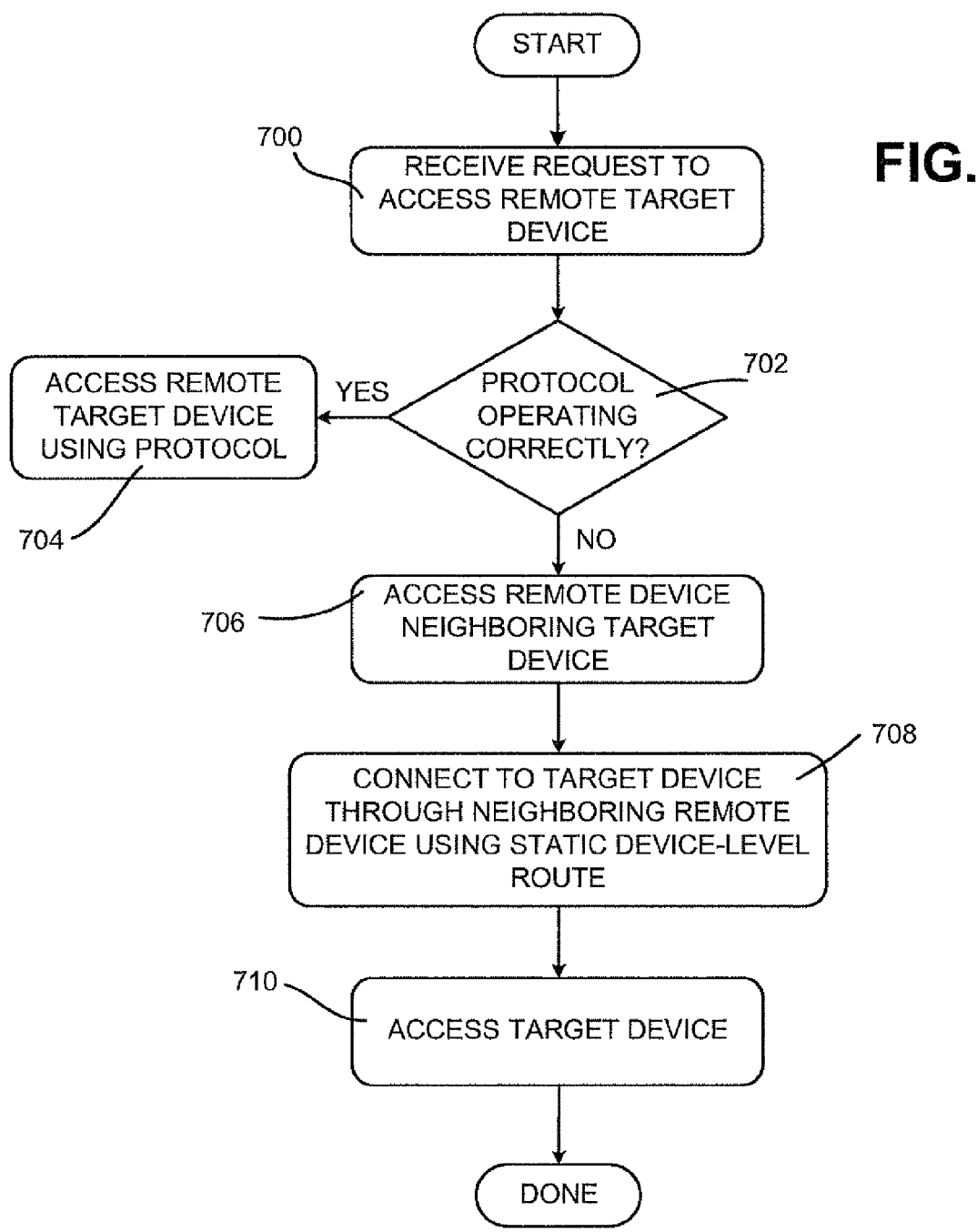

DEVICE COMMUNICATIONS OVER UNNUMBERED INTERFACES

PRIORITY INFORMATION

This application is a continuation of U.S. patent application Ser. No. 11/860,187, filed Sep. 24, 2007, which claims priority under 35 U.S.C. §119 based on U.S. Provisional Application No. 60/887,048, filed Jan. 29, 2007, the disclosures of which are incorporated herein by reference.

TECHNICAL FIELD

Systems and methods consistent with the principles of the invention relate generally to computer networks and, more particularly, to efficiently connecting devices over computer networks.

BACKGROUND OF THE INVENTION

Modern computer networks generally consist of a large number of network devices interconnected by various physical means, including copper wires, fiber optic cables, and wireless technologies. To facilitate routing of information across such networks, routers or other data switching devices are used to ensure that data is accurately and efficiently passed through the network to its final destination. In general, routers and similar types of devices are configured to include a large number of physical interfaces, thereby enabling a single device to route or pass through a very large quantity of data.

In conventional networks, each interface included on a network device is typically assigned a unique network address, thereby ensuring that data or traffic may be uniquely forwarded to an appropriate interface. Unfortunately, the primary network addressing scheme in use today, IPv4, is limited in the number of unique network addresses available for assignment. Further, difficulties in deploying network devices on a network are compounded by the number of unique addresses that must be assigned to enable use of the device.

To remedy these issues, it has been proposed to eliminate addressing for each unique interface on a network device. It has been found that in normal operation, because the data being routed through the network typically is not destined for the routing network device itself, that unique addresses may not be required. Unfortunately, such an unnumbered scheme assumes that the underlying routing protocols running on the network devices remain in operation. Because unique interfaces are not addressed, if an underlying protocol were to fail (along with its associated routing tables or instructions), there may be no way to access the network device from another device on the network by using those interface addresses. In a numbered environment, other network devices may remotely administrate the failed network device by designating the interface address by which it is connected.

Therefore, there is a need for an unnumbered address system that more robustly supports remote access and administration of network devices.

SUMMARY OF THE INVENTION

In a first aspect, a method is provided in which a device level address may be assigned to a network device. The network device may announce the assigned device level address to a neighboring network device over a link. A device level address associated with the neighboring network device may be received over the link. A route may be stored including the received device level address associated with the neighboring network device and the link.

In a second aspect, a method is provided including receiving a first device level address from a neighboring network device over a link; announcing a second device level address to the neighboring network device over the link; and storing a route including the first device level address and the link in a nonvolatile memory.

In a third aspect, a network device for receiving and forwarding traffic in a computer network is provided. The network device may be configured to receive a first device level address identifying the network device; announce the first device level address to a neighboring network device over an interface; receive a second device level address from the neighboring network device; and store a persistent route between the first device level address and the second device level address via the interface in a nonvolatile memory.

BRIEF DESCRIPTION OF THE DRAWINGS

The accompanying drawings, which are incorporated in and constitute a part of this specification, illustrate an embodiment of the invention and, together with the description, explain the invention. In the drawings.

FIG. 7 is a flow diagram that illustrates additional exemplary processing for enabling communication between two or more network devices via unnumbered or unaddressed interfaces

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims.

Figure 1:
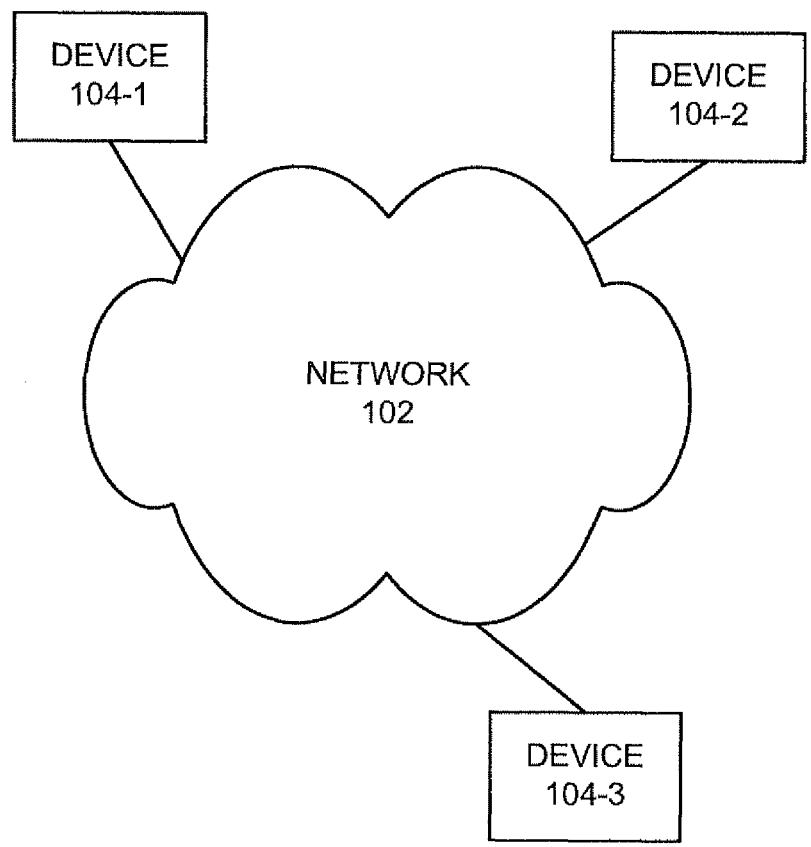
FIG. 1 illustrates an exemplary system including an implementation consistent with the principles of the invention.

FIG. 1 illustrates an exemplary system 100, which includes an implementation consistent with the principles of the invention. System 100 may include a network 102, and devices 104-1, 104-2 and 104-3 (hereinafter collectively referred to as devices 104) connected to network 102. Devices 104 may be servers, host computers, personal computers, wireless PDAs or any other device capable of connecting to a network. System 100 may include more or fewer components than shown in FIG. 1. For example, system 100 may have more or fewer devices 104 connected to network 102.

Figure 2:
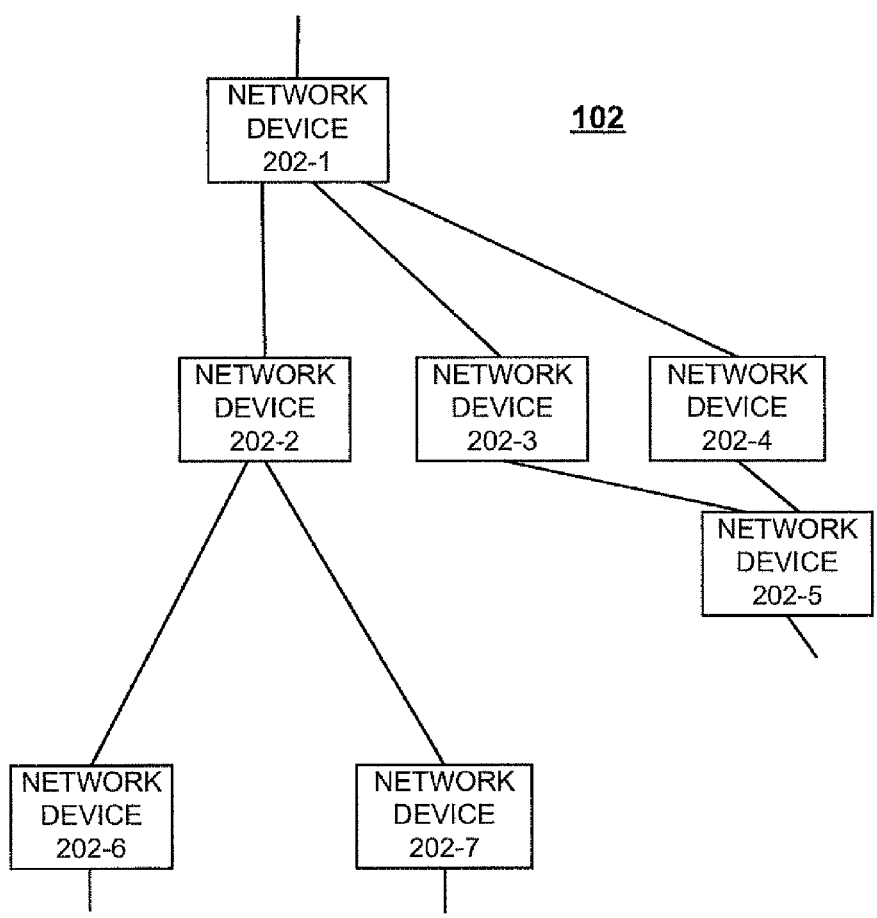
FIG. 2 illustrates a portion of a network shown in FIG. 1.

FIG. 2 illustrates a portion of network 102. Network 102 may include a number of network devices 202-1 through 202-7 (hereinafter collectively referred to as network devices 202). Network 102 may include additional or fewer network devices 202 than shown in FIG. 2. Each network device 202 may have connections with one or more other network devices, such as, for example, one or more routers or network nodes.

Figure 3:
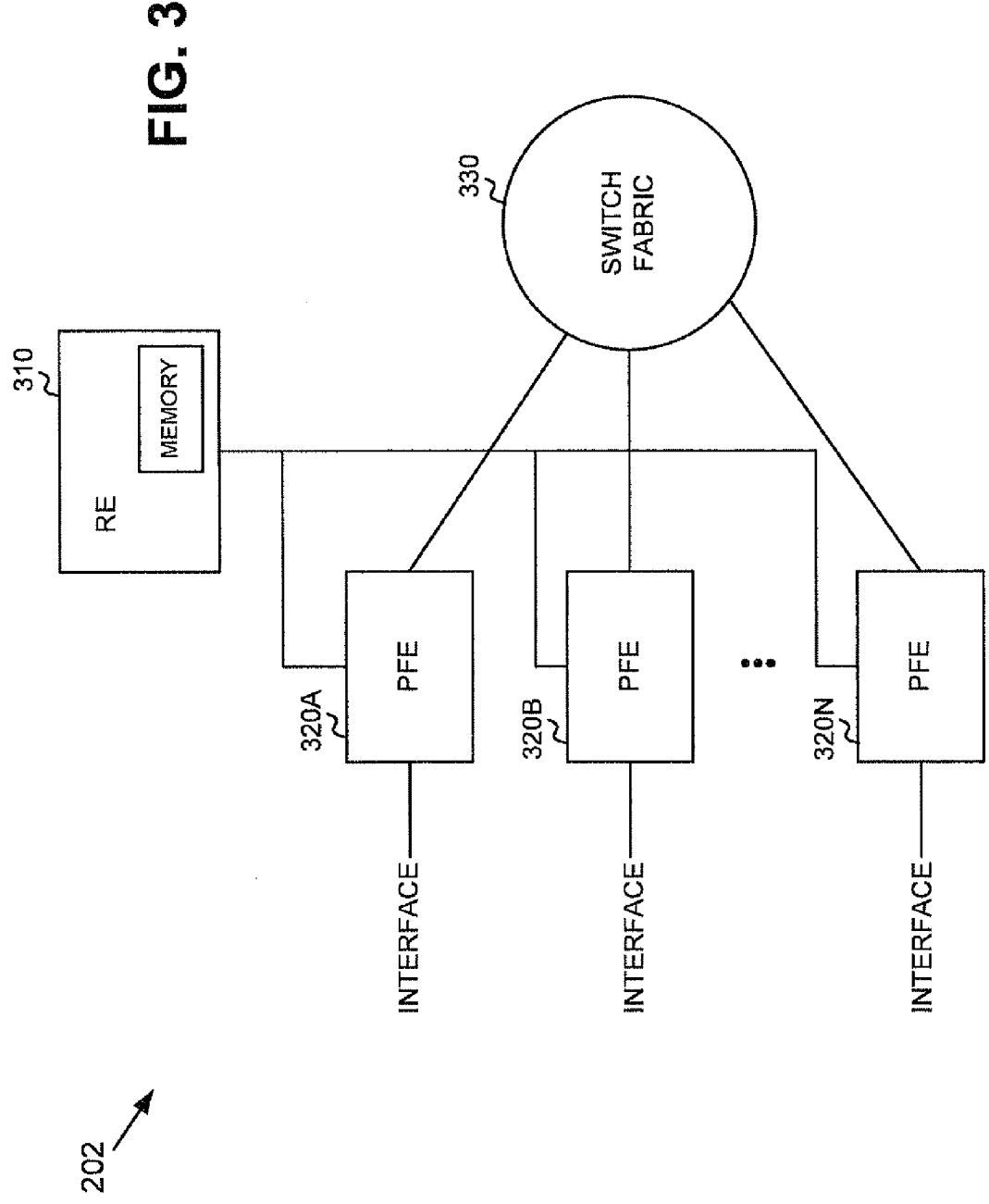
FIG. 3 is a functional block diagram of an exemplary network device consistent with the principles of the invention.

FIG. 3 is a functional block diagram of an exemplary network device consistent with the principles of the invention. In this particular implementation, the network device takes the form of a router 300, which may be used to implement one or more network devices 202. Network device 300 may receive one or more packet streams from a physical link, processes the packet stream(s) to determine destination information, and transmits the packet stream(s) out on a link in accordance with the destination information. Network device 300 may include a routing engine (RE) 310, packet forwarding engines (PFEs) 320A, 320B, . . . , 320N (referred to collectively as "PFEs 320"), and a switch fabric 330.

RE 310 performs high level management functions for network device 300. For example, RE 310 maintains the connectivity and manages information and data necessary for performing routing by network device 300. RE 310 creates routing tables based on network topology information, creates forwarding tables based on the routing tables, and forwards the forwarding tables to PFEs 320. PFEs 320 use the forwarding tables to perform route lookup for incoming packets and perform the forwarding functions for network device 300. RE 310 also performs other general control and monitoring functions for network device 300. As will be described in additional detail below, RE 310 may also include a non-volatile or persistent memory 340 for maintaining core routing information in the event of a protocol or system failure.

PFEs 320 are each connected to RE 310 and switch fabric 330. PFEs 320 receive packet data on physical interfaces or links connected to a network, such as a wide area network (WAN) or a local area network (LAN). Each physical interface could be one of many types of transport media, such as optical fiber or Ethernet cable. The data on the physical interface may be formatted according to one of several protocols, such as the synchronous optical network (SONET) standard, an asynchronous transfer mode (ATM) technology, or Ethernet.

PFEs 320 may process incoming packet data prior to transmitting the data to another PFE or the network. PFEs 320 may also perform route lookup for the data using the forwarding table from RE 310 to determine destination information. If the destination indicates that the data should be sent out on a physical link connected to one of PFEs 320, then the PFE prepares the data for transmission by, for example, adding any necessary headers, and transmits the data from the port associated with the physical interface. If the destination indicates that the data should be sent to another PFE via switch fabric 330, then PFE 320 prepares the data for transmission to the other PFE, if necessary, and sends the data to the other PFE via switch fabric 330.

Figure 4:
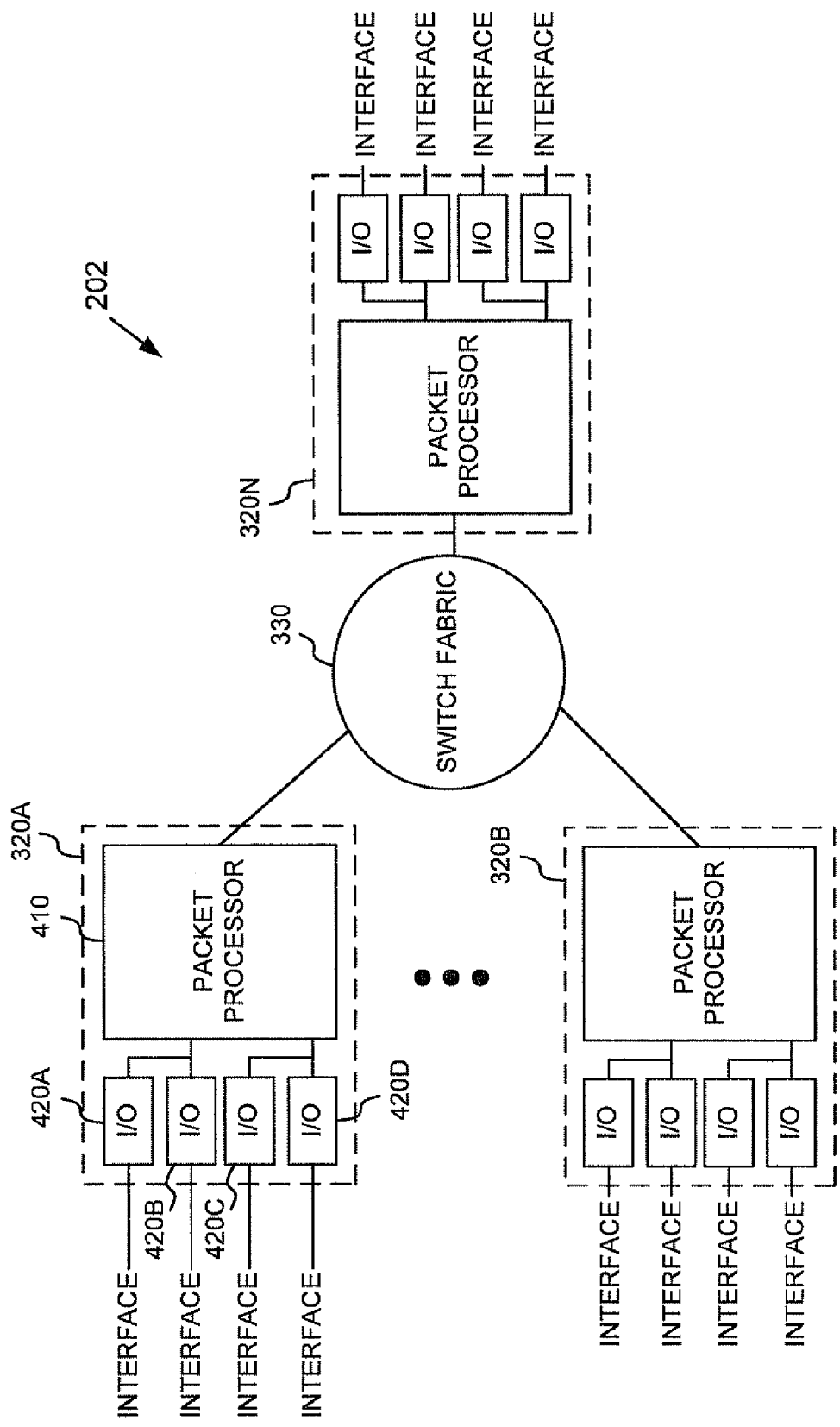
FIG. 4 is a detailed block diagram illustrating portions of the network device of FIG. 3.

FIG. 4 is a detailed block diagram illustrating portions of network device 300. PFEs 320 connect to one another through switch fabric 330. Each of PFEs 320 may include one or more packet processors 410 and pairs of redundant input/output (I/O) interfaces 420A-420D. Although FIG. 4 shows two pairs of redundant I/Os 420A and 420B and I/Os 420C and 420D connected to each of packet processors 410 and three packet processors 410 connected to switch fabric 330, in other embodiments consistent with principles of the invention there can be more or fewer I/Os 420 and packet processors 410.

Each of packet processors 410 performs routing functions and handles packet transfers to and from I/Os 420A-420D and switch fabric 330. For each packet it handles, packet processor 410 performs the previously-discussed route lookup function and may perform other processing-related functions.

I/Os 420A-420D may transmit data between a physical interface and packet processor 410. In one implementation, each of I/Os 420A-420D may be a line card. Different pairs of I/Os may be designed to handle different types of network interfaces. For example, one pair of I/Os may be an interface for an optical link while another pair of I/Os may be an interface for an Ethernet link, implementing any of a number of well-known protocols.

As described above, conventional network devices and addressing schemes provide unique IP addresses to each of the I/Os 420A-420D, thereby enabling communication between any two network devices 202. For example, referring back to FIG. 2, network device 202-1 may wish to forward a packet to network device 202-5. Because at least one interface on network device 202-5 has been assigned a unique IP address, network device 202-1 is easily able to locate and transmit data to network device 202-5.

However, for the reasons described above, such as, the relative scarcity of available IPv4 IP addresses, and configuration/implementation issues raised by requiring management of a large number of interface addresses, it may be desirable to configure a network device to include unnumbered interfaces. In an unnumbered environment, unique IP addresses are not assigned to one or more interfaces 420A-420D. This may seem problematic until it is understood that most packets are transmitted based on an addresses of the final destination of the packet (i.e., the packet's destination address), rather than directed toward the intermediate interface addresses of any intervening network devices.

In accordance with principles of the invention, it may become necessary to communicate with network device 300 in the absence of such addresses. Unfortunately, if a network device 300 configured in this manner were to suffer a system failure or other protocol failure resulting in a loss of protocol-specific interface or I/O routing information, it may become difficult, if not impossible, to remotely access network device 300. In this scenario, re-configuration or repair of the device may require a physical visit or reset.

Referring back to FIG. 2, interfaces between network devices 202 may be configured without unique IP addresses. Accordingly, as described above, absent higher-level routing or protocol information, accessing a device, such as network device 202 may be problematic. In an implementation consistent with principles of the invention, such access may be facilitated by providing each network device 202 with a single, device-level address during initial device configuration. That is, each interface on network device 202 will not be provided with an address, but an address may be assigned to the entire network device and maintained in a non-volatile or persistent storage (e.g., memory 340). As will be set forth in additional detail below, the device-specific address may be used in combination with a link identifier designating the physical connection between network device 202-2 and its neighbors (e.g., devices 202-1 and 202-7). By providing an interface-independent address to network device 202-2, it may be possible to communicated with network device 202-2 upon the occurrence of a higher-level routing or protocol failure.

Figure 5:
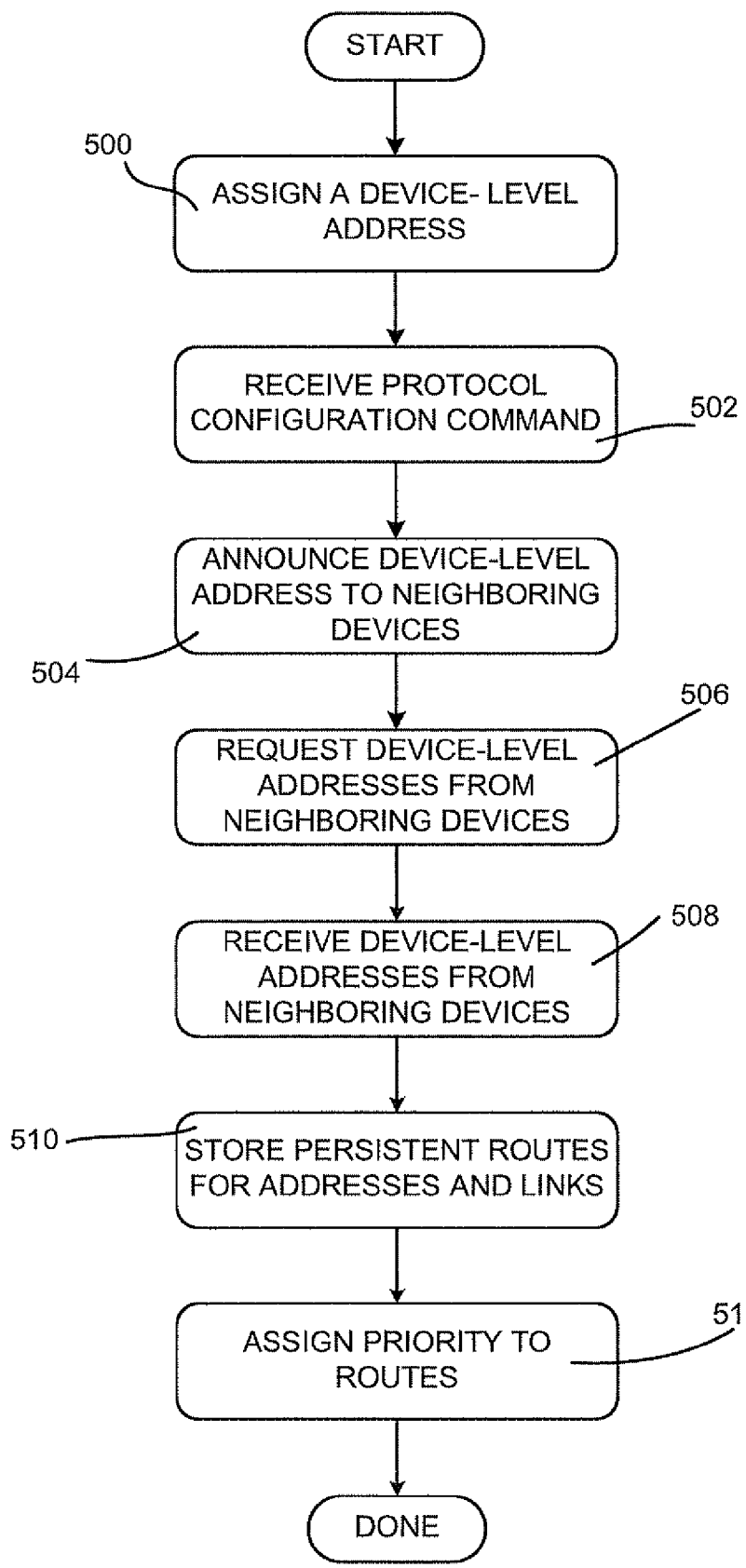
FIG. 5 is a flowchart that illustrates exemplary processing for enabling communication between two or more network devices via unnumbered or un-addressed interfaces.

FIG. 5 is a flow diagram that illustrates exemplary processing for enabling communication between two or more network devices 202 via unnumbered or unaddressed interfaces. Processing may begin by assigning a device-level address to network device 202-2 (act 500). This assignment may be performed by a network administrator responsible for configuring device 202-2 or automatically by a dynamic host control protocol (DHCP) server connected to network device 202-2. By using device level addresses rather than interface level addresses, network administrators may avoid the problems associated with assigning unique addresses across a network, such as sub-netting issues and address allocation issues.

Network device 202-2 then receives a command to configure or initialize a higher-level protocol, (such as, e.g., (open shortest path first) OSPF, intermediate system to intermediate system (IS-IS), point to point protocol (PPP), or address resolution protocol (ARP)) (act 502). As is known in the art, OSPF and IS-IS are layer 3 (i.e., the network layer in the Open Systems Interconnection (OSI) Reference Model) routing protocols, while PPP and ARP are layer 2 (i.e., the data link layer) routing protocols. Consistent with principles of the invention, device-level address information may be exchanged with neighboring network devices using any suitable protocol.

In response to the configuration command, network device 202-2 announces its device-level address to all neighboring devices (e.g., network devices 202-1 and 202-7) (act 504). In one implementation consistent with principles of the invention, such an announcement may occur during initial stages of the requested configuration. Following announcement of its device-level address, network device 202-2 may request device-level addresses from each neighboring device (e.g., devices 202-1 and 202-7) (act 506). In response, network device 202-2 may receive device-level addresses for each neighboring devices (act 508).

Upon receipt of device-level addresses for the neighboring devices in, network device 202-2 may store a persistent listing of the received device-level addresses along with their respective links or interfaces in a non-volatile memory, such as memory 340 (act 510). Additionally, depending on each type of interface, other information may be included within the listing. For example, listings relating to Ethernet interfaces may include each device's media access control (MAC) or hardware address. Additionally, each listing may further include a multiprotocol label switching (MPLS) label associated with the respective interfaces.

Figure 6:
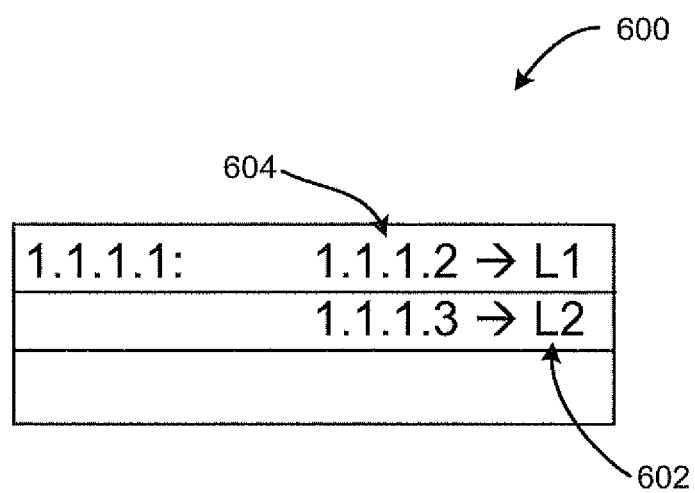
FIG. 6 illustrates an exemplary static routing table consistent with principles of the invention.

One example of such a stored listing or table 600 is provided in FIG. 6. As shown, table 600 may include respective link identifiers 602 and device-level addresses 604 for each neighboring network device (e.g., devices 202-1 and 202-7). Consistent with principles of the invention, the information maintained in table 600 may enable routing and connections to be performed from network device 202-2 to either of 202-1 (device-level address 1.1.1.2 over link L1) and 202-7 (device-level address 1.1.1.3 over link L2) in the absence of additional, controlling routing protocols.

To facilitate proper usage of the routing information in table 600, the device-level routing information may be assigned a priority lower than that of higher-level routing information (act 512). By assigning a lower priority to the routing information in routing table 600, properly running routing protocols may define the processing of network device 202-2 in normal operation. However, in the absence of such protocols or loss of normal device operation, network device 202-2 may fall back to the routing information in table 600, thereby enabling connection with neighboring devices 202-1 and 202-7.

In accordance with principles of the invention, the routing information in table 600 may be dynamic such that modifications to the information made during supplementation configuration/updating/maintenance of the initial protocol results in updating of the corresponding information in routing table 600. For example, assume that table 600 was initially configured to include a route from device 202-2 (with an address of 1.1.1.1) to 202-7 (as designated by device 202-7's assigned device level address 1.1.1.2) on link L1. Subsequent to this initial configuration, the device level address assigned to device 202-7 may be modified by the overlying protocol (e.g., OSPF). Consistent with principles of the invention, network device 202-2 may modify the content of table 600 to reflect the change identified or even triggered by the overlying protocol.

It may be possible for multiple underlying protocols to exist on a single network device 202. In this instance, a hierarchy of protocols may be established to enable efficient determination of which protocol should establish the device level addressing and announcement scheme described above. For example, network device 202-2 may run both OSPF and ARP. It may be established that OSPF is responsible for initially establishing and maintaining the persistent device level routes in table 600. In this manner, although ARP may be fully suitable for establishing the routes, there is no conflict between the two protocols.

FIG. 7 is a flow diagram that illustrates additional exemplary processing for enabling communication between two or more network devices 202 via unnumbered or un-addressed interfaces. Initially, processing may begin by receiving a request to access a remote target device at a first network device (act 700). It may then be determined whether a controlling routing protocol is running on the remote target device, thereby enabling remote access of the target device (act 702). When it is determined that the controlling routing protocol is running on the remote target device, the remote target device may be accessed using the routing protocol (act 704).

When it is determined that the controlling routing protocol is not running on the remote target device (e.g., that routes associated with the protocol have been lost or removed), a remote device neighboring the target device may be accessed (act 706). The static routing information stored in the manner described above with respect to FIG. 5 may then be used to facilitate a connection from the neighboring device to the target device using the target device's device level address and link information (act 708). The target device may then be accessed and administered using the established connection (act 710).

CONCLUSION

The foregoing description describes implementations of network devices that communicate via unnumbered or un-addressed interfaces in the absence of an underlying or controlling routing protocol.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. For example, configurations other than those described may be possible.

While series of acts have been described with regard to FIGS. 5 and 7, the order of the acts may be modified in other implementations. Further, non-dependent blocks may be performed in parallel. Further, the blocks may be modified in other ways.

It will be apparent that aspects, as described above, may be implemented in many different forms of software, firmware, and hardware in the implementations illustrated in the figures. The actual software code or specialized control hardware used to implement these aspects is not limiting of the present invention. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the following claims and their equivalents.

What is claimed is:

1. A method comprising:
    receiving, at a network device, a device level address associated with a neighboring network device over a link;
    storing, by the network device, information associated with a route including the received device level address associated with the neighboring network device and an identifier associated with the link;
    receiving, at the network device, a request to access the neighboring network device;
    determining, by the network device, whether a routing protocol is operating correctly on the neighboring network device; and
    accessing, by the network device, the neighboring network device via the stored route, using the received device level address and the identifier associated with the link, when the routing protocol is not operating correctly on the neighboring network device.

2. The method of claim 1, where receiving the device level address associated with the neighboring network device includes:
    requesting device level addresses from a plurality of neighboring networking devices, and
    receiving, based on the request for the device level addresses, the device level address associated with the neighboring network device.

3. The method of claim 1, further comprising:
    receiving, at the network device, a request to configure a routing protocol on the network device; and
    broadcasting a device level address, associated with the network device, to the neighboring network device over the link during configuration of the routing protocol.

4. The method of claim 3, where the routing protocol is one of:
    an open shortest path first (OSPF) protocol,
    an address resolution protocol (ARP),
    a point-to-point protocol (PPP), or
    an intermediate system to intermediate system (IS-IS) protocol.

5. The method of claim 1, where storing the information associated with the route further comprises:
    storing the received device level address associated with the neighboring network device, the identifier associated with the link, and a media access control (MAC) address associated with the neighboring network device.

6. The method of claim 1, further comprising:
    assigning a priority level to the route lower than priority levels assigned to underlying routing protocols, such that routes associated with the underlying routing protocols are given priority over the route.

7. The method of claim 1, where receiving the device level address associated with the neighboring network device includes:
    announcing a device level address associated with the network device to a number of neighboring network devices over respective links, and
    receiving device level addresses associated with each of the neighboring network device, including the neighboring device, over the respective links.

8. A system comprising:
    a network device including:
        a memory to store instructions; and
        a processor to execute the instructions to:
            store information associated with a route, the information including a device level address associated with a neighboring network device and an identifier associated with a link from the network device to the neighboring network device;
            receive a request to access the neighboring network device;
            determine whether a routing protocol is operating correctly on the neighboring network device; and
            access the neighboring network device via the stored route, using the received device level address and the identifier associated with the link, when the routing protocol is not operating correctly on the neighboring network device.

9. The system of claim 8, where the network device is further to:
    request device level addresses from a plurality of neighboring networking devices, and
    receive, based on the request for the device level addresses, the device level address associated with the neighboring network device.

10. The system of claim 8, where the network device is further to:
    receive a request to configure a routing protocol on the network device; and
    broadcast a device level address, associated with the network device, to the neighboring network device over the link during configuration of the routing protocol.

11. The system of claim 10, where the routing protocol is one of:
    an open shortest path first (OSPF) protocol,
    an address resolution protocol (ARP),
    a point-to-point protocol (PPP), or
    an intermediate system to intermediate system (IS-IS) protocol.

12. The system of claim 8, where, when storing the information associated with the route, the network device is further to:
    store the device level address associated with the neighboring network device, the identifier associated with the link, and a media access control (MAC) address associated with the neighboring network device.

13. The system of claim 8, where the network device is further to:
    assign a priority level to the route lower than priority levels assigned to underlying routing protocols, such that routes associated with the underlying routing protocols are given priority over the route.

14. The system of claim 8, where the network device is further to:

announce a device level address associated with the network device to a number of neighboring network devices over respective links, and receive device level addresses associated with each of the neighboring network device, including the neighboring network device, over the respective links.

15. A system comprising:

a network device including:
- a memory to store instructions; and
- a processor to execute the instructions to:
  - receive a plurality of device level addresses identifying neighboring network devices of the network device;
  - store, based on receiving the plurality of device level addresses, indications of persistent routes between the network device and the neighboring network devices,
    - the network device, when storing the indications of the persistent routes, being to:
      - store the plurality of device level addresses and store identifiers associated with links between the network device and the neighboring network devices;
  - receive a request to access a particular neighboring network device of the neighboring network devices;
  - determine whether a routing protocol is operating correctly on the particular neighboring network device;
  - identify, based on the stored indications of persistent routes, a persistent route corresponding to the particular neighboring network device; and
  - access the particular neighboring device via the identified persistent route when the routing protocol is not operating correctly on the particular neighboring network device.

16. The system of claim 15, where, when receiving the plurality of device level addresses, the network device is further to:
- request device level addresses from the neighboring network devices, and
- receive, based on the request for the device level addresses, the plurality of device level addresses.

17. The system of claim 15, where the network device is further to:
- receive a request to configure a routing protocol on the network device; and
- broadcast a device level address, associated with the network device, to the neighboring network devices over the link during configuration of the routing protocol.

18. The system of claim 17, where the routing protocol is one of:
- an open shortest path first (OSPF) protocol,
- an address resolution protocol (ARP),
- a point-to-point protocol (PPP), or
- an intermediate system to intermediate system (IS-IS) protocol.

19. The system of claim 15, where, when storing the indications of the persistent routes, the network device is further to:
- store the plurality of device level addresses, identifiers associated with links between the network device and the neighboring network devices, and media access control (MAC) addresses associated with the neighboring network devices.

20. The system of claim 15, where the network device is further to:
- assign priority levels to the persistent routes lower than priority levels assigned to underlying routing protocols such that routes associated with the underlying routing protocols are given priority over the persistent routes.

* * * * *